US008099498B2

(12) United States Patent
Allen et al.

(10) Patent No.: US 8,099,498 B2
(45) Date of Patent: Jan. 17, 2012

(54) PROBABILISTIC MESH ROUTING

(75) Inventors: Nicholas A. Allen, Redmond, WA (US);
Stefan R. Batres, Sammamish, WA (US); Justin D. Brown, Seattle, WA (US); Edmund S. V. Pinto, Duvall, WA (US); Karthik Raman, Issaquah, WA (US); John A. Taylor, Bellevue, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 636 days.

(21) Appl. No.: 12/203,826

(22) Filed: Sep. 3, 2008

(65) Prior Publication Data

US 2010/0057933 A1 Mar. 4, 2010

(51) Int. Cl.
*G06F 15/173* (2006.01)
(52) U.S. Cl. ........................................ 709/226
(58) Field of Classification Search .................. 709/207, 709/226
See application file for complete search history.

(56) References Cited

U.S. PATENT DOCUMENTS

| | | | |
|---|---|---|---|
| 5,892,923 | A | 4/1999 | Yasuda et al. |
| 6,243,360 | B1 | 6/2001 | Basilico |
| 6,567,380 | B1 | 5/2003 | Chen |
| 6,732,273 | B1 | 5/2004 | Byers |
| 6,826,148 | B1 | 11/2004 | Lee |
| 7,039,050 | B1 | 5/2006 | Mutreja |
| 7,234,109 | B2 | 6/2007 | Atkinson |
| 2002/0184344 | A1 | 12/2002 | Elvanoglu |
| 2004/0018839 | A1 | 1/2004 | Andric et al. |
| 2004/0098667 | A1 | 5/2004 | Atkinson |
| 2004/0148334 | A1 | 7/2004 | Arellano |
| 2005/0044197 | A1 | 2/2005 | Lai |
| 2005/0108340 | A1 | 5/2005 | Gleeson |
| 2005/0198169 | A1 | 9/2005 | Holten |
| 2006/0029198 | A1 | 2/2006 | Dorneich |
| 2006/0041647 | A1 | 2/2006 | Perham |
| 2006/0059165 | A1 | 3/2006 | Bosloy |
| 2006/0085505 | A1 | 4/2006 | Gillum |
| 2006/0123467 | A1 | 6/2006 | Kumar |
| 2006/0123479 | A1 | 6/2006 | Kumar |
| 2006/0129650 | A1* | 6/2006 | Ho et al. ............... 709/207 |
| 2006/0215660 | A1 | 9/2006 | Vigoureux et al. |
| 2006/0242292 | A1 | 10/2006 | Carter |
| 2006/0265689 | A1 | 11/2006 | Kuznetsov |
| 2007/0011256 | A1 | 1/2007 | Klein |

(Continued)

OTHER PUBLICATIONS

This paper appears in: INFOCOM 2004. Twenty-third AnnualJoint Conference of the IEEE Computer and Communications Societies Issue Date: Mar. 7-11, 2004 on pp. 918-928 vol. 2.*

(Continued)

*Primary Examiner* — Joseph Avellino
*Assistant Examiner* — Marshall McLeod
(74) *Attorney, Agent, or Firm* — Workman Nydegger

(57) ABSTRACT

Routing messages using unreliable routing data. A method includes receiving a message from a computer readable communication medium. Characteristic properties of the message are calculated so as to determine state requirements for a service instance at a service for processing of the message. An attempt is made to acquire an appropriate service instance that satisfies the state requirements for processing the message. A determination is made that attempting to acquire an appropriate service instance that satisfies the state requirements for processing the message is not successful at acquiring an appropriate service instance. As a result, the message is redirected using an unreliable local cache of routing information and without coordination between processing nodes.

21 Claims, 6 Drawing Sheets

U.S. PATENT DOCUMENTS

| | | | |
|---|---|---|---|
| 2007/0064702 | A1 | 3/2007 | Bates et al. |
| 2007/0064703 | A1 | 3/2007 | Hernandez |
| 2007/0168546 | A1 | 7/2007 | Greeff |
| 2007/0276956 | A1 | 11/2007 | Dorai et al. |
| 2008/0168150 | A1 | 7/2008 | Chen |
| 2010/0030798 | A1 | 2/2010 | Kumar |
| 2010/0057707 | A1 | 3/2010 | Allen |

OTHER PUBLICATIONS

"Cisco AON: A Network-Based Intelligent Message Routing System," Author Unknown, Cisco Application Networking Services Modules, Copyright 1992-2008 Cisco Systems, Inc., 8 pgs. [online] [retreived on Jul. 25, 2008]. Retrieved from the Internet: http://www.cisco.com/en/US/prod/collateral/modules/ps6438/product_data_sheet0900aecd802c1f9c.html.

"Sonic ESB V5.5 Developer's Guide," Author Unknown, Sonic Software Corporation, Copyright 2004, 422 pgs. [online] [retreived on Jul. 25, 2008]. Retrieved from the Internet: http://www.sonicsoftware.com/developer/documentation/docs/esb_dev.pdf.

Andrew T. Campbell, et al., "Design, Implementation and Evaluation of Cellular IP", IEEE Personal Communications, vol. 7, Issue: 4, pp. 42-49, Publication Year: 2000. See pp. 44-45.

U.S. Appl. No. 12/203,790, mailed Jul. 6, 2011, Office Action.

"Apache Synapse Enterprise Service Bus (ESB)," Author Unknown, Date Unknown, 1 pg. [online] [retrieved on Jul. 28, 2008]. Retrieved from the Internet: http://synapse.apache.org/.

"Constraint-Based Personalization Model: Multi-Channel Messaging," by Kal Toth and Sai Rajkiran Nagboth, Department of Computer Science, Oregon State University, Date Unknown, 5 pages. [online] [retrieved on Jul. 28, 2008]. Retrieved from the Internet: http://www.research.att.com/~rjana/TothNagboth.pdf.

"Demaq: A Foundation for Declarative XML Message Processing," by Alexander Bohm, Carl-Christian Kanne and Guido Moerkotte, Department of Mathematics and Computer Science, University of Mannheim, Germany, Date Unknown, 11 pgs. [online] [retrieved on Jul. 28, 2008]. Retrieved from the Internet: http://www.cidrdb.org/cidr2007/papers/cidr07p04.pdf.

U.S. Appl. No. 12/203,790, mailed Mar. 29, 2011, Office Action.

* cited by examiner

PROBABILISTIC MESH ROUTING

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Messages can be routed between networked computers using a message-processing system. A simple arrangement for a message-processing system includes a service running on a single machine that directly receives messages from client machines. As the amount of resources required by the service grows, either by increasing the number of messages or the average cost of processing a message, it eventually may become impractically expensive to construct a single machine that can handle the processing load. One common practice is to execute multiple instances of a service across several machines so that the processing load is distributed among many, cheaper machines. Distributing the processing load among many machines might also be used to eliminate critical points so as to improve overall system reliability.

The parallel efficiency of a system measures how effective it is to add more machines. When the parallel efficiency is 100%, doubling the number of machines halves the processing load for each machine. The parallel efficiency may be a smaller percentage, zero, or even negative. A negative parallel efficiency means that the overhead of adding machines is larger than the gain in total processing power. Coordination between the processing machines is one of the common causes of poor parallel efficiency. For example, before a message is routed to a service in a topology including a number of services, it may be necessary to ensure that the service has the necessary state information to handle the message. Illustratively, a state bag with state information for a particular e-commerce shopping cart may be loaded at a particular service in a topology. A message updating the shopping cart (such as adding new items, removing items, completing an order, etc) may be received at the topology. If multiple services in the topology can handle shopping cart functionality, there may be a need at the topology to determine which of the services includes the state bag for the particular shopping cart in question.

There are many examples of services in which messages can be processed independently. Message independence allows a message to be sent to any available processing node. There are also examples of services that have an obvious association between messages and processing nodes. An obvious association permits routing an incoming message to the appropriate processing node with a low level of coordination. An example of an obvious association is for a network connection to exactly equal the boundary of a set of messages that must be processed together. However, there are many examples where association overhead may be needed to coordinate messages and services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein is directed to a method of routing messages using unreliable routing data. The method may be practiced at a processing node in a computing environment. The method includes receiving a message from a computer readable communication medium. One or more characteristic properties of the message are calculated so as to determine state requirements for a service instance at a service for processing of the message. An attempt is made to acquire an appropriate service instance that satisfies the state requirements for processing the message. When attempting to acquire an appropriate service instance that satisfies the state requirements for processing the message is successful at acquiring an appropriate service instance, the message is processed based on the state requirements. The method includes determining that attempting to acquire an appropriate service instance that satisfies the state requirements for processing the message is not successful at acquiring an appropriate service instance. As a result, the message is redirected using an unreliable local cache of routing information and without coordination between processing nodes so as to attempt to cause the message to reach a server node that has an appropriate service instance or that can successfully acquire an appropriate service instance that satisfies the state requirements for processing of the message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments are directed to services in which there is some non-obvious association between messages and processing nodes. For example, one example of a non-obvious association is based on content in the message whose location and format depend on application-defined protocols and/or whose value reflects content seen in previous messages.

Some embodiments reduce the level of coordination for non-obvious associations by making the processing nodes tolerant of routing errors and employing optimistic routing. An incorrect routing decision will be detected during later processing. In response to an incorrectly routed message, partially completed work is discarded and the message is rerouted, again in an optimistic fashion. Additionally, information may be returned to a node that incorrectly routed a message, such that future messages routed by that node will likely be routed correctly. Although some messages may require more work to process due to encountering routing errors, the average cost of processing a message decreases because the optimistic routing can be made frequently correct and coordination between nodes can be reduced.

As noted, some embodiments allow for routing a message based on a characteristic property of the message without coordination between processing nodes by using a best guess. This may be accomplished by maintaining an unreliable local cache of routing data. The unreliable local cache of routing data may include, for example, an association between message characteristics, message metadata characteristics or other characteristics with service nodes. Further, the routing data may include updates based on received redirect messages. For example, nodes that incorrectly receive messages may be able to provide information identifying the correct node for the data. Embodiments may also include functionality for deciding how to handle the redirect message based on the original message delivery mechanism or characteristic. Further, routing may include incorporating a load-balancing mechanism as part of the definition for best guess routing.

Some embodiments may include an atomic create-load primitive implemented by an instance coordinator based on a characteristic property of a message. For example, additional associations may be supplied between characteristics and a service instance as part of the atomic create-load operation Lookups performed to supply associations may be based on more than one characteristic. Further, optimization of lookup may be accomplished by using a local catalog of service instances. More detailed descriptions of these embodiments will be included herein further below.

Embodiments may include functionality for generating a redirect message as an outcome of a failed create-load operation. In some embodiments, the redirect address may be resolved using a directory service or discovery protocol. Further, routing data for other service instances may be included as part of the redirect message.

Figure 1:
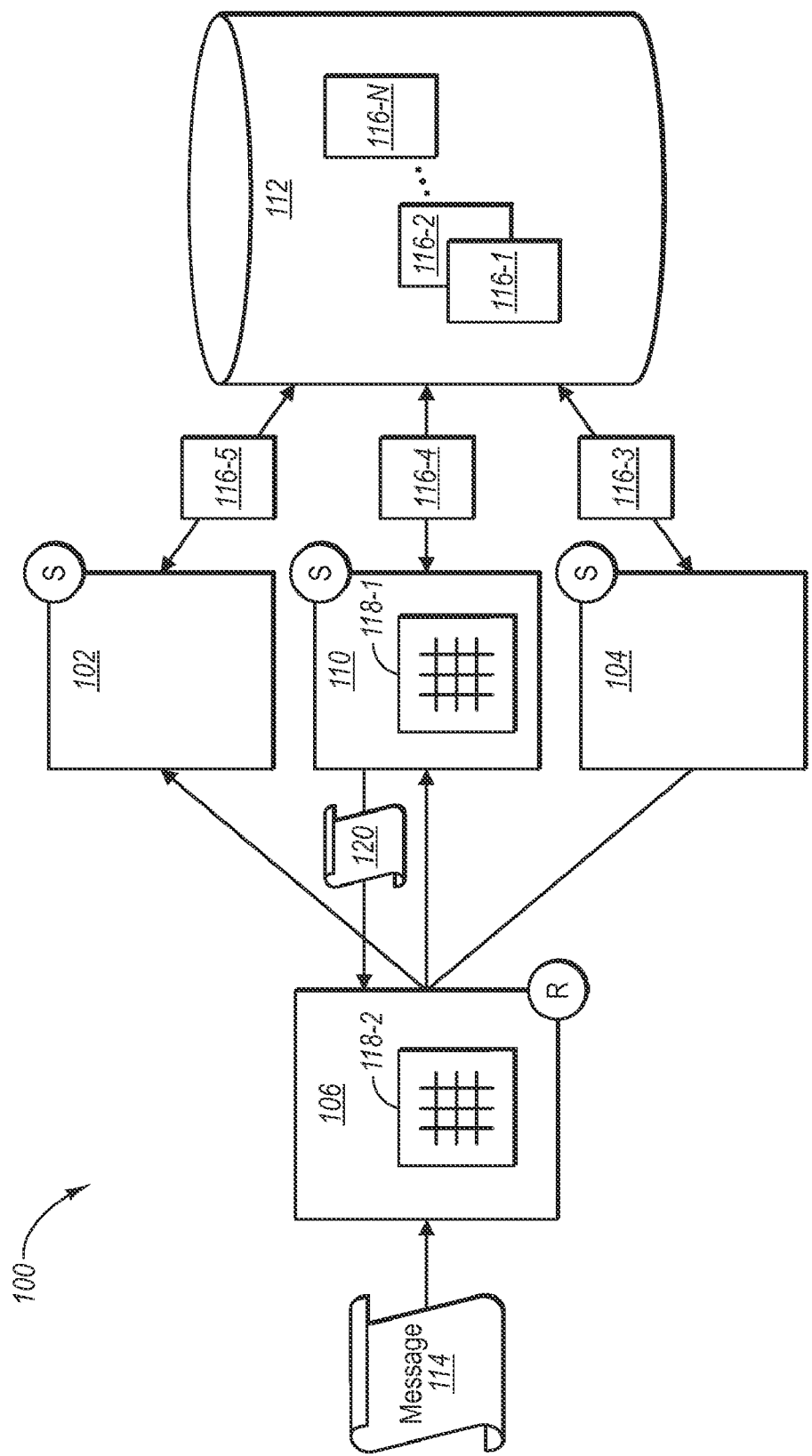
FIG. 1 illustrates a network environment including router nodes and service nodes for processing messages.

Referring now to FIG. 1, a network 100 of interconnected processing nodes is illustrated. The processing nodes may be implemented using computing hardware and software, including appropriate processors, memory devices, computer storage, computer executable instructions implemented on computer readable media, as defined later herein, etc. Some of the processing nodes are capable of executing instances of an application service. Some processing nodes are referred to herein as server nodes, and are illustrated by the example server nodes 102 and 104 illustrated in FIG. 1. Some processing nodes are capable of routing messages among the processing nodes. These nodes are referred to herein as router nodes, and are illustrated by the router node 106. Over time and without coordination, there may be changes to the number of nodes, the connections between nodes, or the role of a node (e.g. gaining or losing the router or server capabilities). Therefore, any depiction of the network represents a snapshot of a particular moment in time. The processing nodes are not necessarily permanently partitioned into routers and servers. In particular, a processing node may function as both (illustrated by router-server node 110, which may be referred to herein as a router node or a server node) or as neither.

An application, including one or more service instances 116, designated herein generally by 116 and specifically by 116-X, where X is a variable for indicating a particular service instances 116, executes on the network 100. The application may create and destroy service instances 116 on an ongoing basis. Thus, the current set of service instances 116 may continuously change. A service instance 116 processes messages and over time may accumulate instance state. In the present example, a service instance 116 exists at only one of the server nodes at a time. When a service instance 116 is not located at any of the server nodes, it is held by an instance coordinator 112 that all of the server nodes can access. One typical implementation of an instance coordinator 112 is a database that durably stores instance state for the service instances 116.

The application may continuously receive messages 114 from external sources at various processing nodes. Processing a message may require the instance state of an existing service instance 116, require the blank slate of a new service instance 116 that has never processed a message before, or have no instance state requirements. The processing requirements may be part of the definition of the application and thus may differ from application to application and may not be readily apparent from the message. One function of some embodiments is to direct a message to a server node that satisfies the processing requirements of the message without requiring excessive coordination between processing nodes. In some embodiments this may be accomplished by calculating a characteristic, which can be used to determine the processing requirements of the message 114.

Figure 2A:
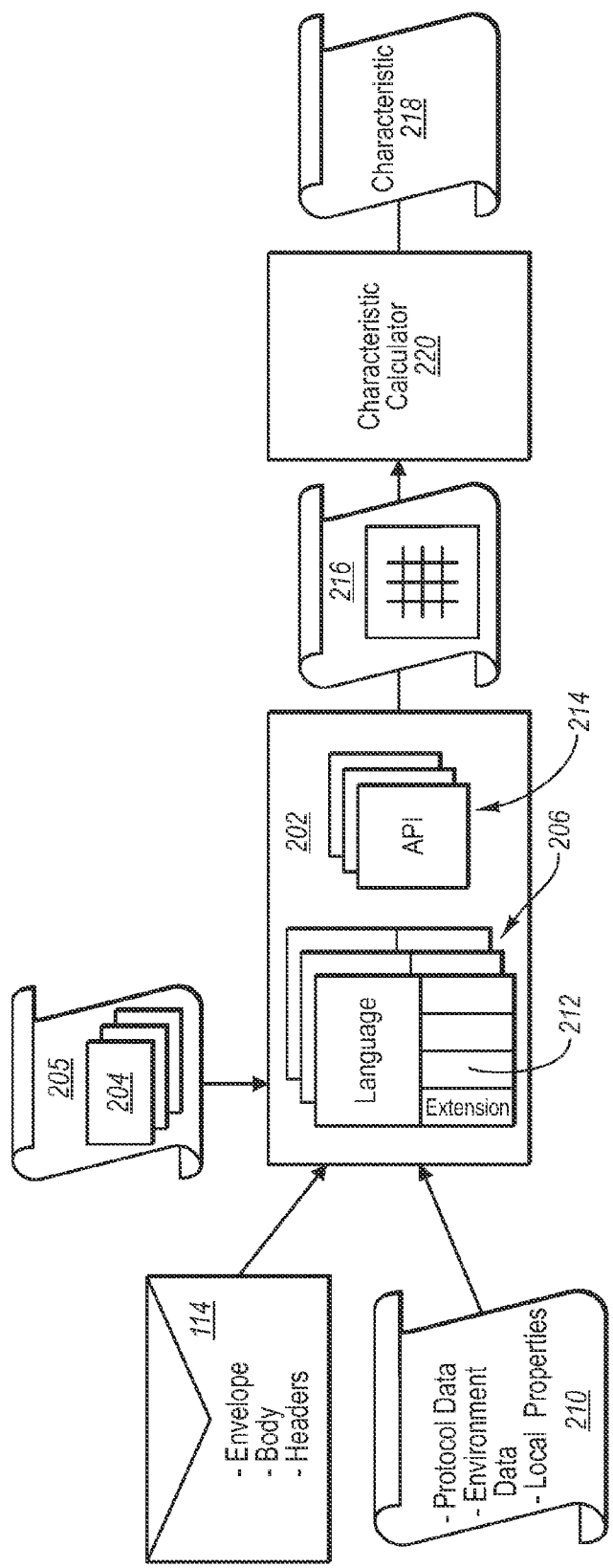
FIG. 2A illustrates an environment where characteristics can be calculated for messages.

Characteristic calculation may be performed using, for example, techniques described in U.S. application Ser. No. 12/203,790 titled "Query-Oriented Message Characterization," filed concurrently herewith, and which is incorporated herein by reference in its entirety. FIG. 2A-2D illustrates how characteristic calculation may be performed for some embodiments. Referring now to FIG. 2A, an example is illustrated. FIG. 2A illustrates a query engine 202. The query engine 202 includes functionality for processing queries 204, where the queries 204 are queries against various sources of data, such as messages 114 which include message data or non-message data 210 obtainable from other sources. In particular, some embodiments may be practiced such that a message characteristic may be specified using a query over message content, metadata or other information. The query engine may include support for various languages 206. In one specific example, a query may be formulated using XPath expressions as a query language.

Often query languages 206, such as XPath, have native functionality for accessing information in a limited variety of formats and from a limited variety of sources, while not natively including functionality for access to other information. For example, XPath includes native functionality for accessing information in an XML structured data structure, such as a message formatted using XML, but may not include functionality for determining other information from other services. Nonetheless, the query language may be extended by including extensions 212 to include functionality for accessing other services. In the XPath query language, the extensions are referred to as selectors. Additionally, some embodiments may include functionality for normalization of access to different storage locations using extensions to the query language. In some embodiments, normalization of access to different storage locations may use a mutually-agreed upon data structure. Optimization of computing multiple characteristics for the same message may be performed, as will be described in more detail below, by merging queries and executing them simultaneously or in parallel.

As illustrated in FIG. 2A, information sources may include a message 114 which includes message data. The message may include information such as envelope data, data in the message body, data in the headers of the message, etc. As noted above, the query engine 202 may include functionality for extracting the message data. For example, in one embodiment, the query engine may include functionality supporting the XPath query language for extracting data from XML formatted messages. Other query languages 206 may also or alternatively be used. Notably, the query engine 202 may also include functionality for invoking various application programming interfaces (APIs) 214. APIs 214 include programmed functionality for interacting with information sources to obtain data from the sources. Notably, the languages 206 may be considered in some respects to be APIs.

FIG. 2A further illustrates non-message data 210. The non-message data may be data from any one of a number of different sources and may include metadata about message data, or other data not directly present the message data. Metadata associated with data in the message 114 may include information such as protocol data indicating protocols used to send the message 114; environmental data, local properties, time of day, etc.

As noted previously, FIG. 2A illustrates that the query engine 202 performs queries 204 against the data sources. Based on the queries 204, the query engine 202 generates intermediate results 216, which may be instance values of data. The intermediate results 216 may include tables of data or other forms of data. For example, the intermediate results 216 may include information such as a specific time of day (which may or may not be associated with the message 114), a specific protocol used to transmit a message 114, or other information. The intermediate results are typically not unit-less results, but rather represent some specific unit. For example, the intermediate results 216 may represent a time of day unit, a protocol unit, a transport unit, or some other specific unit. Additionally, the intermediate results may be of one or more different data types. For example, the intermediate results may be integers, floating points, strings, or other data types. Additionally, a set of intermediate results may have a mix of different data types. For example, a time may be expressed as one or more integers while a protocol may be expressed as one or more strings. Both the time integers and the protocol strings may be included in the same set of intermediate results 216.

The intermediate results 216 can be used to create a characteristic 218 by a characteristic computation module 220. The characteristic 218 may be, for example, a number calculated using a hash algorithm or other numerical method to calculate a number based on the intermediate results 216. For example, in one embodiment, the characteristic 218 may be a unit-less 128 bit hash number that represents a globally unique identifier. The characteristic computation module 220 may be embodied using computer hardware and software configured to calculate a hash or other representation, such as for example, a numerical representation.

As will be discussed in more detail below, some embodiments may be practiced where coordination occurs between the computation of a message characteristic 218 and the messaging infrastructure. In particular, a messaging infrastructure may catalog the information that it can potentially supply for a query 204. For example, the messaging infrastructure may be able to provide information regarding transports, information regarding protocols, etc. The messaging infrastructure can promise availability of information at a particular time. In some embodiments, the promise is related to some functionality or performance of some action at the messaging infrastructure. Analysis of a query 204 may be performed before characteristic computation at the characteristic computation module 220 to determine what information will be needed. Optimizations of characteristic computation may be performed so as to perform calculations for a characteristic computation at more convenient times subject to constraints based on information availability.

As will be discussed in more detail below, some embodiments may be practiced where transformation of information is performed before and/or after a query.

With reference once again to FIG. 2A, a more detailed example with specifics is illustrated. Consider a message 114 for which it is desirable to compute a characteristic. The existence of this message 114 can be presupposed without regard to how the message 114 is or was generated. Thus, this could be a message that is being sent, being received, or possibly even created out of thin air without any connection to a messaging operation. The message may be represented in a variety of formats. As an example, consider a message represented using the Simple Object Access Protocol (SOAP) 1.2 format. Such a message will have storage locations for a message envelope, a message body, and any number of message headers. The message may also have associated with it metadata that is not contained within the message envelope, such as local message properties, delivery properties, or information in the ambient environment. This metadata may be represented by the non-message data illustrated at 210. Thus, sources of data may be referred to as either sources of information from within the message or sources of information from outside the message.

To compute a characteristic for the message 114, all available sources of information can be drawn upon. The computation of the characteristic will frequently require only a subset of the available information. This subset is described by a query specification 205 including one or more queries 204. Each query includes an identifier and a query procedure. The query procedure defines how a value is extracted from the available information.

As an example of a query specification 205, in one embodiment, a query procedure is specified using an XPath expression. For example, the message may be a purchase order in the SOAP format, a fragment of which is as follows:

```
<s:Envelope>
    <s:Header>
        ... header data included in the message ...
    </s:Header>
```

```
<s:Body>
    <po:PurchaseOrder purchaseOrderNumber="123">
    ... purchase order data defined by the application ...
    </po:PurchaseOrder>
</s:Body>
</s:Envelope>
```

The XPath expression "/s:Envelope/s:Body/po:PurchaseOrder/@purchaseOrderNumber" specifies a portion of the message. In the present example, the XPath expression specifies the value of the attribute named purchaseOrderNumber on the element named PurchaseOrder inside the element named Body inside the element named Envelope. In the present example, the XPath expression is named "PONumber" to create an association between the identifier PONumber and the fact resulting from evaluating the XPath expression, i.e. the number 123 which represents a purchase order unit 123.

Upon supplying the query engine 202 with a query specification 205 including queries 204 and necessary information sources, such as the message 114 and/or access to sources that generate the non-message date 210, the query engine 202 computes a table of named query results illustrated in the intermediate results 216.

In the illustrated example, the calculation of the characteristic 218 is defined in terms of the named query results 216 to abstract the calculation process from how information was accessed or organized. New information sources can be added to the system either by unifying them with existing information sources or by extending the query engine with a new access method. For example, the standard XPath language only provides access to message data. The XPath language could be extended with a new function, as illustrated by the extensions 212, to access non-message data.

In one embodiment, the HTTP Referer header is not part of the message data but could be accessed in a similar fashion using the XPath expression "z:GetProtocolData( )/Referer" to specify a portion of the non-message data 210. In this case, the value of the Referer property in the protocol data is not contained within the message. Although the SMTP From header comes from a different information source, it too could be accessed using the GetProtocolData function. Thus, the grouping of information to the same or different access methods can be done at the convenience of the developer.

Figure 2B:
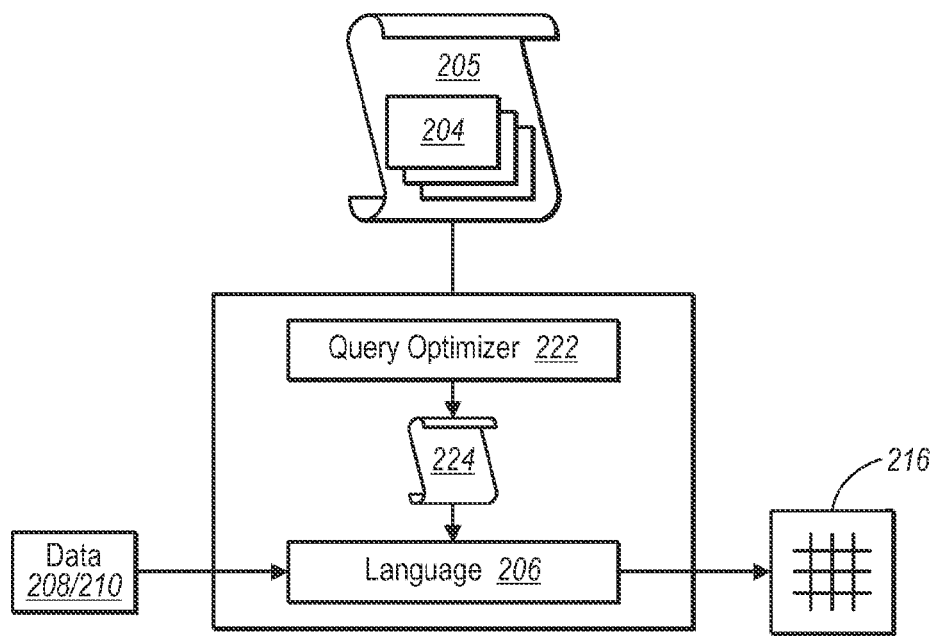
FIG. 2B illustrates a query optimization module.

With reference now to FIG. 2B, additional details of the query engine 202 will now be discussed, and in particular with respect to optimizing query processing. If multiple queries 204 are performed against the same sources of information such as the message data and non-message data 208/210, it is often possible to perform the collection of queries more efficiently when they are taken together, rather than one at a time. To do this in one embodiment, the query engine 202 includes a query optimization module 222 which first transforms the original query specification 205 including into an optimized query specification 224 before executing the optimized query specification 224 using the language 206 (API's 214 as illustrated in FIG. 2A). The optimized query specification 224, when processed, produces the same table of query results 216.

In one embodiment, the query optimizer 222 of the query engine 202 joins together queries that have common sub-expressions so that a single common sub-expression is only evaluated once. Thus, the query engine 202 operating on a query specification 205 containing the two queries "/s:Envelope/s:Body/PurchaseOrder1" and "/s:Envelope/s:Body/PurchaseOrder2" may only have to scan through the Envelope and Body elements of the message 114 once to satisfy both queries.

Figure 2C:
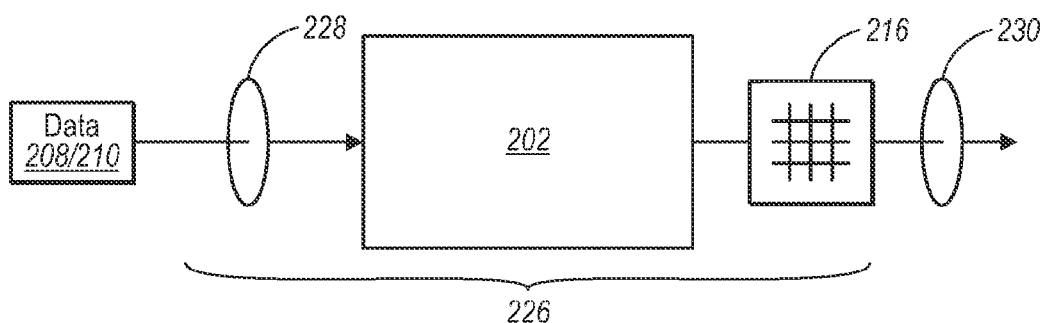
FIG. 2C illustrates transforming data prior to and after calculating intermediate results.

Referring now to FIG. 2C, additional features of the query engine 202 with respect to transforming data prior to and post processing is illustrated. In the illustrated embodiment, the query engine 202 composes with other components 228 and 230 as part of a processing pipeline 226. These components 228 and 230 act on the inputs and outputs respectively to the engine. One or more transformations may be applied at component 228 to the information sources before being read by the engine and one or more transformation may be applied at component 230 to the query results before the characteristic 218 (see FIG. 2A) is calculated. Each fact in an information source and each named query result may have an individually crafted transformation applied to them; or, transformations may be applied to groups of facts or query results.

Applications often have a preferred time for computing a characteristic 218. It is typical for the application to want to compute the characteristic 218 as late as possible or as early as possible depending on the type of decision being made. However, an application may be unable to compute the characteristic 218 until all of the necessary information is available. An example of this conflict occurs when sending a message. It may desirable to compute the characteristic as early as possible so that the characteristic is known before any responses to sending the message are observed. However, the information necessary to compute the characteristic may not be available until the message is partially or fully sent. An example of information that is not available until very late is a message identifier that is assigned by the delivery system when the message is written onto the wire.

Figure 2D:
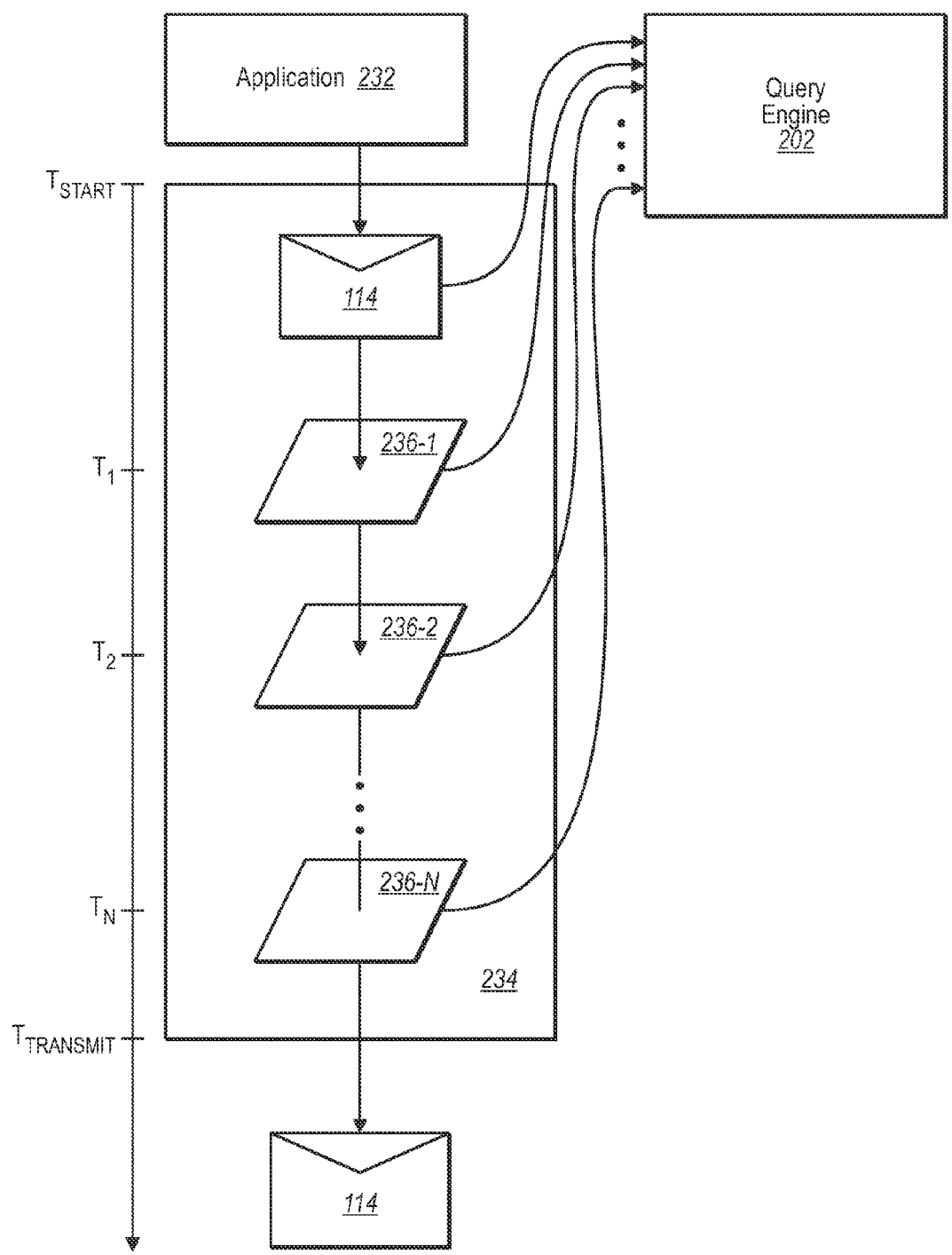
FIG. 2D illustrates additional characteristic calculation details for some embodiments.

Referring now to FIG. 2D, an example of one embodiment that addresses these concerns is illustrated. To reason about a conflict, what information will be used by the characteristic computation and when that information will be available should be known. Prior to the message 114 being sent by an application 232, a messaging infrastructure 234 is introspected to identify the variety of information that this particular configuration will generate. The messaging infrastructure 234 may also make one or more statements about when each fact will be available. Statements may be promises that the facts will be available at a particular time or stage of processing. Also prior to the message 114 being sent, the query specification 205 (see FIG. 2A) may be introspected to determine the variety of information that this particular query specification 205 will request.

FIG. 2D illustrates the messaging infrastructure 234 against a timeline axis T. The timeline axis T illustrates increasing time in the down direction. At $T_{Start}$, the message 114 is sent from the application 232 to the messaging infrastructure 234. In some embodiments, about the time the message 114 is sent, the list of information identifiers that will be required by the queries 204 in the query specification 205 is associated with the message 114. Notably, embodiments may be implemented to associate the list of information identifiers prior to the message 114 being sent, at the time the message 114 is sent, or in some embodiments after the message 114 is sent. Additionally, the message 114 is associated with a callback that invokes the query engine 202 and characteristic computation module 220 (see FIG. 2A). Components 236-1-236-N may act on the message 114. As components, referred to here generally as 236 and specifically by 236-X where X is a number identifying a particular component, act on the message 114, they conceptually add checkmarks to the list of information identifiers that will be required by the queries 204 as each identified fact becomes available. In one embodiment, a fact becomes available when it is possible to execute a specific process that results in the value of the fact. This process might simply return a pre-calculated value for the fact, or alternatively might require performing additional calculations. Thus, although a fact may be made available to query engine 202 at a particular time, the value of the fact may not be known in a definite sense until query engine 202 requests the value of the fact at a later time, if query engine 202 ever chooses to do so. Once all of the identified information is available the callback can be invoked to complete the characteristic computation. In the example illustrated, FIG. 2D shows information about the message 114 being made available to the query engine 202. At time $T_1$, information provided by component 236-1 is made available to the query engine 202. At time $T_2$, information provided by component 236-2 is made available to the query engine 202. At time $T_N$, information provided by component 236-N (which signifies that any number of components 236 may be implemented in the messaging infrastructure 234) is made available to the query engine 202.

The timeline axis T includes a time $T_{Transmit}$ representing the message 114 being transmitted out of the messaging infrastructure 234, such as by transmitting the message onto the communication wire. The communication wire may be any one of a different number of media including network cables or wireless transport media. The completion of the computation may take place earlier or later than the message being transmitted depending on the promises made by the components 236. In one embodiment, the completion of the callback is used to solve races between sending and receiving messages. The application 232 refrains from processing any received messages that might depend on the characteristic 218 of a previously sent message 114 until all of those characteristics have been computed.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 3:
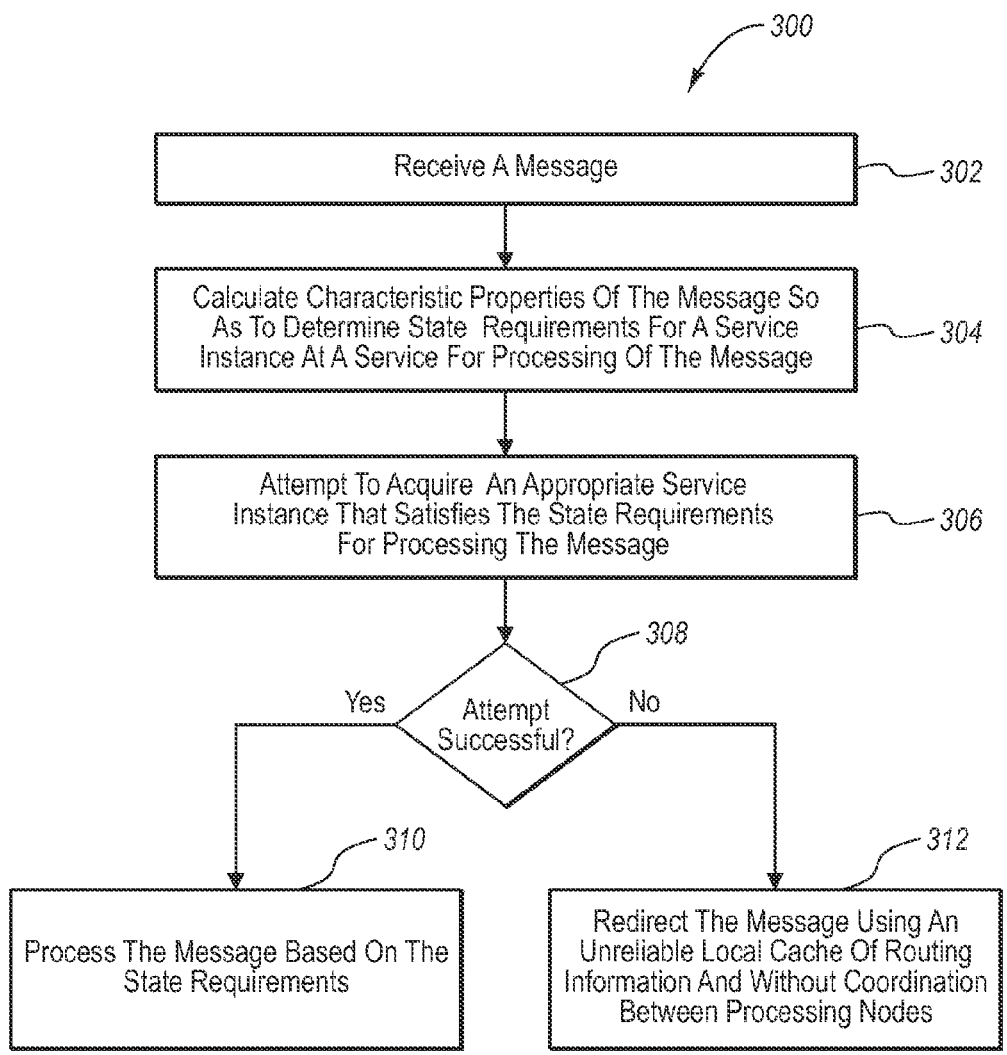
FIG. 3 illustrates a method of processing messages.

Referring now to FIG. 3, operation of a server node, such as nodes 102, 110, and 104 in FIG. 1 is illustrated. FIG. 3 illustrates a method 300. The method 300 includes an act of receiving a message (act 302). The message (e.g. message 114) may be received from a computer readable communication medium, such as a network medium, computer bus, or other communication medium.

The method 300 further includes calculating characteristic properties of the message so as to determine state requirements for a service instance (such as one of service instances 116) at a service (such as one of services 102, 104 or 110) for processing of the message (act 304). Calculating characteristic properties may be performed, in some embodiments, as illustrated above in FIGS. 2A-2D above, and the accompanying description.

The method 300 further includes attempting to acquire an appropriate service instance (e.g. a service instance 116) that satisfies the state requirements for processing the message 114. At 308, a decision block illustrates different acts that are performed depending on whether or not the attempt was successful. When attempting to acquire an appropriate service instance 116 that satisfies the state requirements for processing the message is successful at acquiring an appropriate service instance 116, the message is processed based on the state requirements (act 310). Alternatively, the method 300 may include determining that attempting to acquire an appropriate service instance 116 that satisfies the state requirements for processing the message is not successful at acquiring an appropriate service instance 116, and as a result, redirecting the message 114 using an unreliable local cache of routing information and without coordination between processing nodes (act 312) so as to attempt to cause the message 114 to reach a server node that has an appropriate service instance 116 or that can successfully acquire an appropriate service instance 116 that satisfies the state requirements for processing of the message.

Although not illustrated in FIG. 3, the method 300 may further include performing processing on the message 114 that is independent of a service instance 116. An example of processing that is independent of a service instance 116 is performing statically-configured protocols and message transformations.

Illustrating now details of method 300 in more detail, when a message arrives at a server node, such as node 102, 104, or 110, an initial presumption can be made that the server node meets the processing requirements of the message 114. After some amount of processing is performed on the message 114, the server node reaches a point at which further processing requires a service instance 116.

To identify the appropriate service instance 116, the server node may calculate a characteristic property using the message and locally available state but without coordination between the processing nodes. For example, if a message 114 arrives at server node 110, the server node 110 may calculate a characteristic property using the message 114 and locally available state but without coordination between the other processing nodes 106, 102, and 104. The characteristic computation is defined by the application. A characteristic might be information from the message delivery process, a part of the message, or even the whole message itself. As an example, the server node may identify that the message is a purchase order request with a particular format, identify that the purchase order format includes a purchase order identifier at a fixed location, and extract the purchase order identifier to form the characteristic.

The server node then consults with the instance coordinator 112 to obtain an appropriate service instance 116 with appropriate state for the characteristic. This consultation may include several acts performed by the instance coordinator 112 atomically:

In particular, the consultation may include determining whether a service instance 116 associated with this characteristic already exists. For example, the instance coordinator 112 may determine if an appropriate service instance 116 exists at the instance coordinator 112 or at any of the processing nodes in the network 100. If no service instance 116 with the characteristic exists, a new service instance 116 is created and the service instance 116 is associated with the characteristic. If a service instance 116 with the characteristic exists, the consultation may include determining where the service instance 116 exists. The service instance 116 may already exist at the requesting server node (in the present example, server node 110). If the service instance 116 exists at the instance coordinator 112, the service instance 116 is transferred to the requesting server node 110. If the service instance 116 exists at some other server node, such as server nodes 102 or 104, the instance coordinator 112 may reject the load request and transmit an error message to the server node 110. The error message includes an identifier for the server node (e.g. 102 or 104) at which the service instance 116 currently exists.

Embodiments may also be implemented in environments where locks can be placed on service instances 116. In some of these embodiments, functionality may be included for providing a requesting processing node with information about a lock owner when the instance coordinator 112 determines that the appropriate service instance 116 is locked by one of the processing nodes in the network. In one embodiment, the instance coordinator 112 can provide information to requesting systems regarding locks on service instances 116.

As part of obtaining a service instance 116, the server node 110 may supply one or more additional characteristics that it wishes to have associated with the service instance 116. Although these additional characteristics are not used as part of the initial lookup, after performing the associations a future lookup for one of the additional characteristics will match the service instance 116. If the server node 110 includes additional characteristics, these associations are performed as part of the atomic create or load process and, in some embodiments, only if the create or load process succeeds in obtaining a service instance 116. In particular, attempting to acquire an appropriate service instance 116 from an instance coordinator 112 may include sending one or more additional characteristics. The additional characteristics are not considered for this attempt to acquire a service instance 116, but, if the processing node should be successful at this attempt to acquire an appropriate service instance 116, the additional characteristics are added to the plurality of characteristics that describe the service instance 116. As an example, the server node 110 may look up a service instance 116 using a characteristic derived from a purchase order identifier and supply an additional characteristic derived from a shipper tracking number. In the future, the service instance 116 could be found using the shipper tracking number even if the purchase order identifier was not known. Thus, in some embodiments, the instance coordinator associates a plurality of characteristics with service instances. Attempting to acquire an appropriate service instance from an instance coordinator may include sending any one or more of the characteristics to the instance coordinator without sending all of the characteristics associated with the service instance. In the example illustrated, either one of the purchase order identifier or the shipper tracking number could be provided without need to provide the other identifier or number.

In some embodiments of the invention the instance coordinator 112 accepts more than one characteristic for lookup and returns the service instance 116 that matches any one of the characteristics. The outcome when the characteristics do not uniquely define a service instance 116 may be to favor a particular service instance 116 based on a property of the characteristic specification, to favor a particular service instance 116 based on a property of the service instances 116, or to reject the lookup operation as being ambiguously specified.

In some embodiments the server node 110 maintains a local catalog of service instances 116 that it currently has. This local catalog allows the server node to refrain from consulting the instance coordinator 112 when there are no additional associations to perform.

In some embodiments, if the server node 110 succeeds in obtaining a service instance 116, it dispatches the received message 114 to the remainder of the application. Otherwise, the server node 110 constructs a redirect message containing the address returned by the instance coordinator and instructs the sender of the message to retransmit the message to this new address. For example, assume that the instance coordinator 112 indicates that a particular service instance 116-3 is located at the server node 104. The server node 110 may construct a redirect message 120, which is sent to the router node 106 (which sent the message 114 to the server node 110) indicating that the message 114 should be retransmitted to service node 104.

In some embodiments the new address is not a physical machine address. For example, it might be a logical address or service name that is to be looked up in a directory known to the sender of the message. As another example, the new address might be resolved using a dynamic discovery protocol rather than a directory service.

In some embodiments, the instance coordinator 112 provides routing information for service instances 116 other than what is strictly required to route the message to improve overall routing quality.

A redirect message from the server node 110 or other router node may contain one or more additional associations between characteristic properties and processing nodes. The additional characteristic properties are not necessarily related to a message currently being processed. The unreliable local cache may be updated according to the one or more additional associations.

The following description includes further details about the functionality of the router nodes (such as router nodes 106 and 110) in general. Additionally, details may be included regarding processing the redirect message 120.

Figure 4:
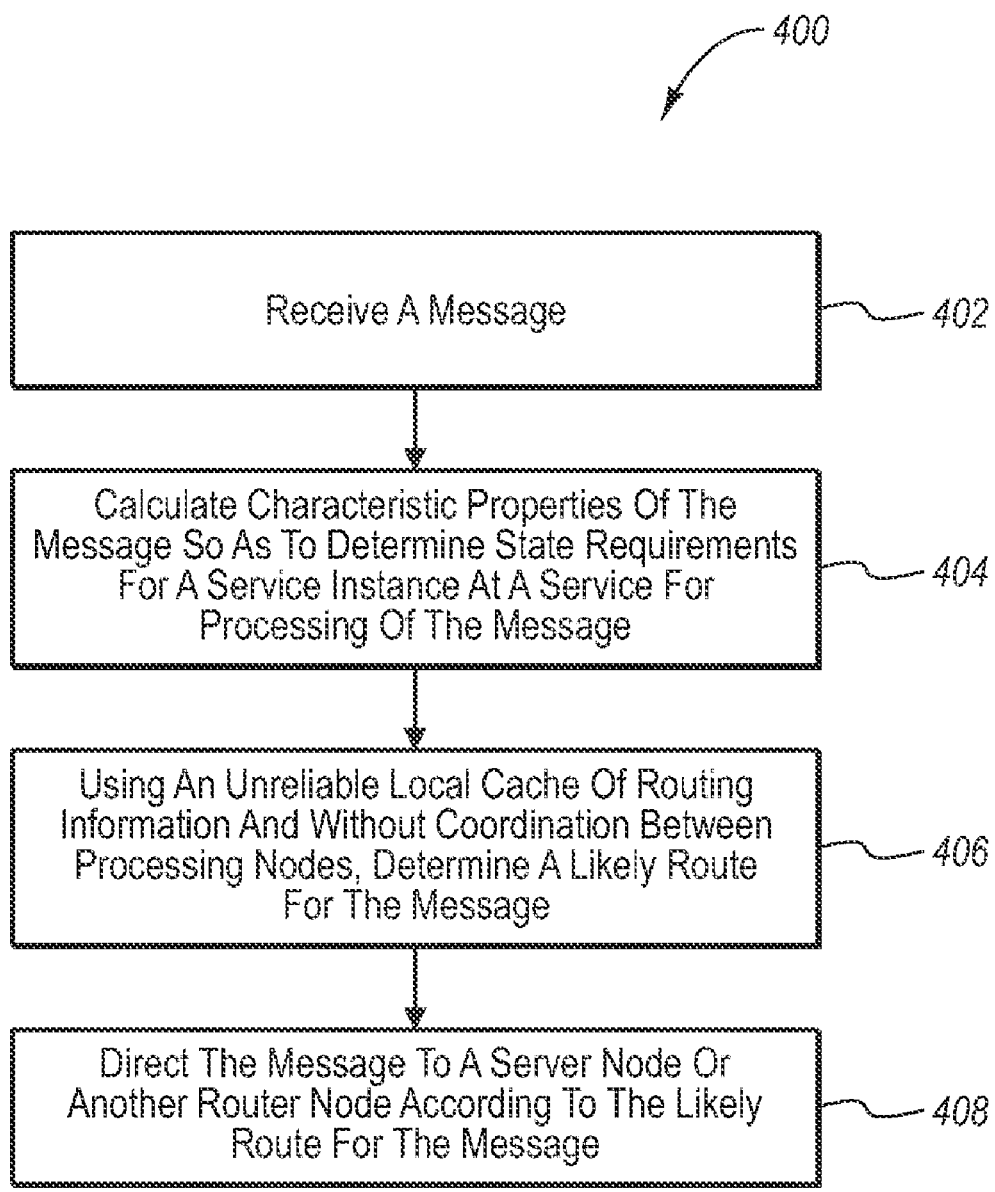
FIG. 4 illustrates a method of routing messages using unreliable routing data.

FIG. 4 illustrates a method 400. The method 400 includes receiving a message (act 402). The message may be received from a computer readable communication medium. The method 400 further includes calculating characteristic properties of the message so as to determine state requirements for a service instance 116 at a service for processing of the message (act 404). The method 400 includes using an unreliable local cache of routing information and without coordination between processing nodes, determining a likely route for the message (act 406). The message is directed to a server node or another router node according to the likely route for the message.

The method 400 may be performed so as to perform processing that is independent of a service instance 116 (see FIG. 1). An example of processing that is independent of a service instance 116 is performing statically-configured protocols and message transformations.

In the case of a router-server node, such as node 110, the server node might be the server component of the same processing node.

The operation of a router node, in some respects, is similar to that of a server node. However, instead of consulting an authoritative source for the service instances 116, such as the instance coordinator 112, the router node, such as router node 106 consults potentially unreliable local routing data. For example, the router node 106 may include a routing table 118-2 that includes potentially unreliable local routing data. The router node 106 may from time to time suffer amnesia causing it to forget some or all of the routing data; or, false routing data may be incorporated due to incorrect guesses. There is no expectation that the router node 106 will be informed in a timely fashion, or indeed ever, that processing nodes have been added to or removed from the network 100, that processing nodes have changed their type or connectivity with other processing nodes, or that a service instance 116 has moved from one place to another. The router node 106 makes a best guess determination of the correct route using the routing data in the routing table 118-2. The best guess may be based on, among other things, previously routed messages 114 and routing data from the instance coordinator 112 received previously in redirect messages 120.

In some embodiments, the best guess incorporates a load-balancing mechanism, such as round-robin load balancing, or directs messages to processing nodes perceived as underutilized.

When the router node 106 receives a redirect message 120 for a message 114 it previously routed, the router node 106 decides how to handle the routing failure. The router node 106 may, depending on the delivery mechanism, characteristic, and routing data, retransmit the message 114 itself. In other cases, the router node 106 may return the redirect message 120 to the original sender. For example, while not illustrated in FIG. 1, an additional router node may have transmitted the message 114 to router node 106. The router node 106 may use the unreliable local routing data in the table 118-2 to determine that the message should be sent to the router node 110. The router node 110 may determine that the message 114 was incorrectly sent to the router node 110. The router node 110 in response to this determination, sends the redirect message 120 to the router node 106. In some embodiments, the router node 110 may also send information indicating what is believed to be the correct processing node for the message 114. This information indicating what is believed to be the correct processing node for the message 114 may be derived from unreliable information in the local routing table 118-1, or from reliable coordinated information from the instance coordinator 112. In response to the redirect message, the router node 106 may retransmit the message 114 to the processing node indicated in the redirect message 120

In some embodiments, the router node always returns a redirect message if possible. Messages received from a simplex message source are retransmitted while messages received from a duplex message source return a redirect message.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a processing node in a computing environment, a method of routing messages using unreliable routing data, the method comprising:

receiving a message from a computer readable communication medium;

calculating one or more characteristic properties of the message so as to determine state requirements for a service instance at a service for processing of the message;

attempting to acquire an appropriate service instance that satisfies the state requirements for processing the message, wherein when attempting to acquire an appropriate service instance that satisfies the state requirements for processing the message is successful at acquiring an appropriate service instance, the message is processed based on the state requirements;

determining that attempting to acquire an appropriate service instance that satisfies the state requirements for processing the message is not successful at acquiring an appropriate service instance, and as a result, redirecting the message using an unreliable local cache of routing information and without coordination between processing nodes so as to attempt to cause the message to reach a server node that has an appropriate service instance or that can successfully acquire an appropriate service instance that satisfies the state requirements for processing of the message; and performing processing that is independent of the service instance on the message prior to or subsequent to calculating the one or more characteristic properties of the message.

2. The method of claim 1, the processing that is independent of the service instance being performed on the message prior to calculating the one or more characteristic properties of the message.

3. The method of claim 1, wherein attempting to acquire an appropriate service instance that satisfies the state requirements for processing the message comprises attempting to acquire an appropriate service instance from an instance coordinator, wherein the instance coordinator stores all service instances in a network that are not already held at processing nodes in the network.

4. The method of claim 3, further comprising an act of creating a new appropriate service instance when the instance coordinator determines that no appropriate service instance exists at the instance coordinator or at any of the processing nodes in the network.

5. The method of claim 3, further comprising an act of providing a requesting processing node with information about a lock owner when the instance coordinator determines that the appropriate service instance is locked by one of the processing nodes in the network.

6. The method of claim 3, wherein the instance coordinator associates a plurality of characteristics with service instances and wherein attempting to acquire an appropriate service instance from an instance coordinator comprises sending one or more additional characteristics, the additional characteristics not being considered for this attempt to acquire a service instance, but, if the processing node should be successful at this attempt to acquire an appropriate service instance, the additional characteristics being added to the plurality of characteristics that describe the service instance.

7. The method of claim 3, wherein the instance coordinator associates a plurality of characteristics with service instances and wherein attempting to acquire an appropriate service instance from an instance coordinator comprises sending any one or more of the characteristics to the instance coordinator without sending all of the characteristics associated with the service instance.

8. At a processing node in a computing environment, a method of routing messages using unreliable routing information, the method comprising:

receiving a message from a computer readable communication medium;

calculating one or more characteristic properties of the message so as to determine state requirements for a service instance at a service for processing of the message and performing processing that is independent of the service instance on the message prior to or subsequent to calculating the one or more characteristic properties of the message;

using an unreliable local cache of routing information and without coordination between processing nodes, determining a likely route for the message based on the state requirements; and directing the message to a server node or another router node according to the likely route for the message.

9. The method of claim 8, wherein directing the message to a server node comprises directing the message to a server component of the processing node.

10. The method of claim 9, wherein directing the message to a server node comprises referencing a local catalog of service instances existing at the processing node.

11. The method of claim 8, wherein determining a likely route for the message comprises using a load balancing mechanism for routing messages.

12. The method of claim 8, further comprising:

receiving a redirect message from the server node or other router node indicating that the message should be sent to a different processing node; and updating the unreliable local cache to indicate messages with the one or more characteristic properties of the message should be routed to the different processing node.

13. The method of claim 12, wherein the redirect message from the server node or other router node contains one or more additional associations between characteristic properties and processing nodes, the additional characteristic properties not being related to the message currently being processed, the method further comprising an act of updating the unreliable local cache according to the one or more additional associations.

14. The method of claim 12, further comprising determining how to respond to the redirect message by directing the message to the different processing node.

15. The method of claim 12, further comprising determining how to respond to the redirect message by providing a redirect messages to the system from which the message was received.

16. The method of claim 12, further comprising resolving the redirect message using a directory service protocol.

17. The method of claim 12, further comprising resolving the redirect message using a discovery protocol.

18. The method of claim 8, the processing that is independent of the service instance being performed on the message prior to calculating the one or more characteristic properties of the message.

19. The method of claim 8, the processing that is independent of the service instance being performed on the message after calculating the one or more characteristic properties of the message.

20. In a computing environment, a system configured to route messages in a network, the system comprising:

one or more processors;

computer readable storage media storing computer executable instructions configured to be executed by a processor to implement computer modules, wherein the computer modules comprise:

a calculator module configured to calculate one or more characteristic properties of a message so as to determine state requirements for a service instance at a service for processing of the message;

an instance coordinator module, wherein the instance coordinator stores all service instances in a network that are not already held at processing nodes in the network;

a service node module, wherein the service node module is configured to attempt to acquire an appropriate service instance from the instance coordinator that satisfies the state requirements for processing the message, wherein when attempting to acquire an appropriate service instance that satisfies the state requirements for processing the message is successful at acquiring an appropriate service instance, the message is processed based on the state requirements, the service node module being further configured to create a new appropriate service instance when the instance coordinator determines that no appropriate service instance exists at the instance coordinator or at any of the processing nodes in the network; and a router module, wherein the router module is configured to direct the message using an unreliable local cache of routing information and without coordination between processing nodes so as to attempt to cause the message to reach a server node that has an appropriate service instance or that can successfully acquire an appropriate service instance that satisfies the state requirements for processing of the message.

21. At a processing node in a computing environment, a method of routing messages using unreliable routing information, the method comprising:

receiving a message from a computer readable communication medium;

calculating one or more characteristic properties of the message so as to determine state requirements for a service instance at a service for processing of the message;

using an unreliable local cache of routing information and without coordination between processing nodes, determining a likely route for the message based on the state requirements; and directing the message to a server component of the processing nodes.

* * * * *